Sept. 13, 1949.

G. E. DATH 2,481,574

COMBINED SPRING AND FRICTION SHOCK
ABSORBING MECHANISM

Filed Sept. 11, 1946

2 Sheets-Sheet 1

Inventor
George E. Dath
By Henry Fuchs
Atty.

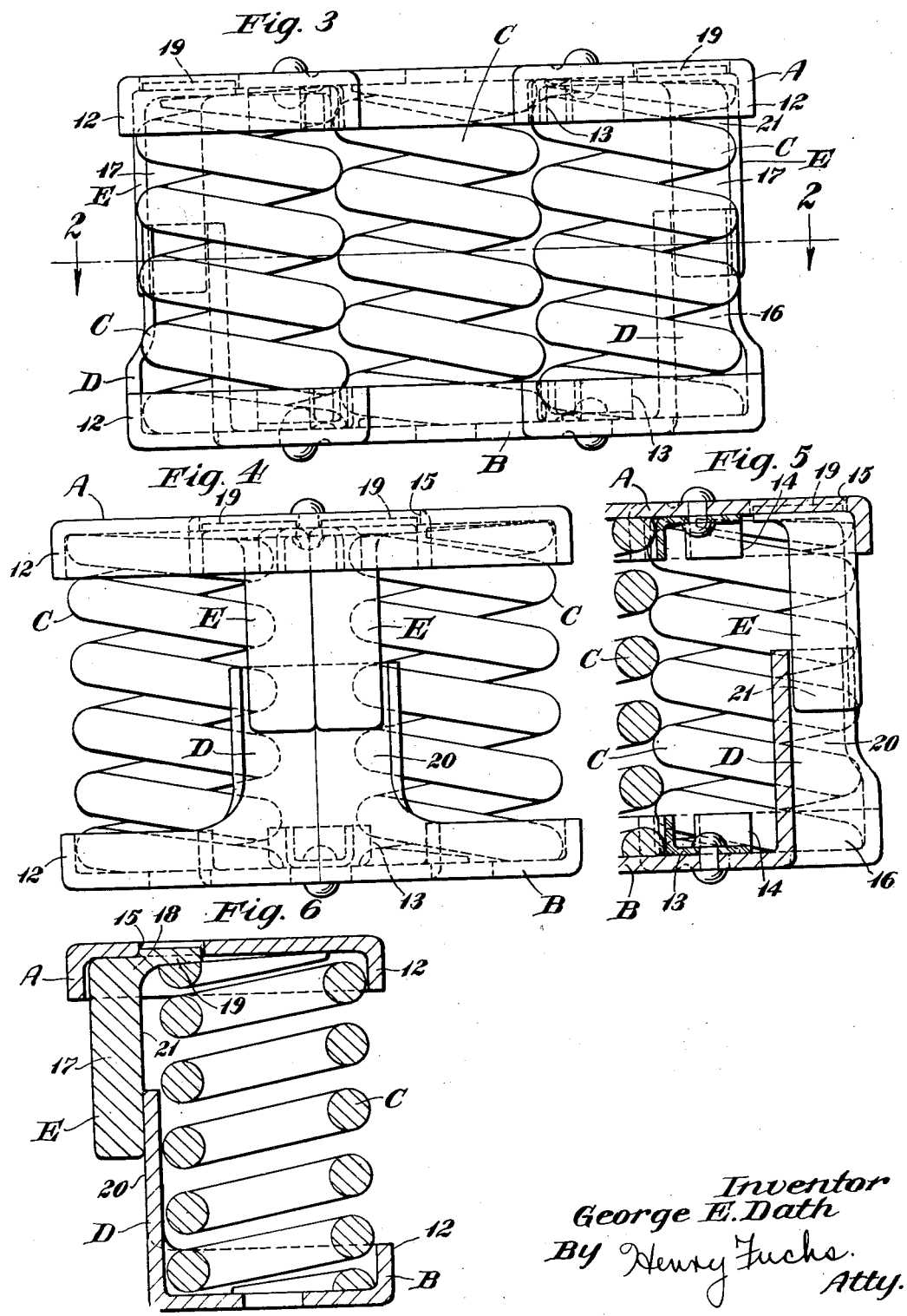

Patented Sept. 13, 1949

2,481,574

UNITED STATES PATENT OFFICE 2,481,574

COMBINED SPRING AND FRICTION SHOCK ABSORBING MECHANISM

George E. Dath, Mokena, Ill., assignor to W. H. Miner, Inc., Chicago, Ill., a corporation of Delaware Application September 11, 1946, Serial No. 696,267

5 Claims. (Cl. 267—9)

1

This invention relates to improvements in combined spring and friction shock absorbing mechanisms.

One object of the invention is to provide a combined spring and friction shock absorbing mechanism for railway car trucks including a cluster of springs, top and bottom spring follower plates between which the cluster is interposed, and simple and efficient means for dampening or snubbing the action of the springs comprising cooperating, relatively slidable friction elements, respectively movable with the spring followers and being pressed into tight frictional engagement with each other through the pressure exerted by the springs.

A further object of the invention is to provide a shock absorber, as set forth in the preceding paragraph, wherein the friction element, which is movable with one of the follower plates, is formed integral therewith and the cooperating friction element, which is movable with the other follower plate member, is rockable on the latter to be tilted toward the fixed element and is forced into tight frictional engagement with the latter by the action of the truck springs.

A still further object of the invention is to provide a mechanism of the character hereinbefore mentioned comprising a cluster of springs, spring follower plates between which the cluster is interposed, and cooperating, lengthwise slidable friction elements, one of which is provided with a projecting foot portion supported for rocking movement on the cooperating spring follower plate to be tilted toward the other element by action of the truck springs, wherein the spring follower plate on which the tiltable element rocks is recessed to accommodate the foot portion of the plate, thereby permitting the use of a foot portion of ample thickness to give the required strength.

Other objects of the invention will more clearly appear from the description and claims hereinafter following.

Figure 1:
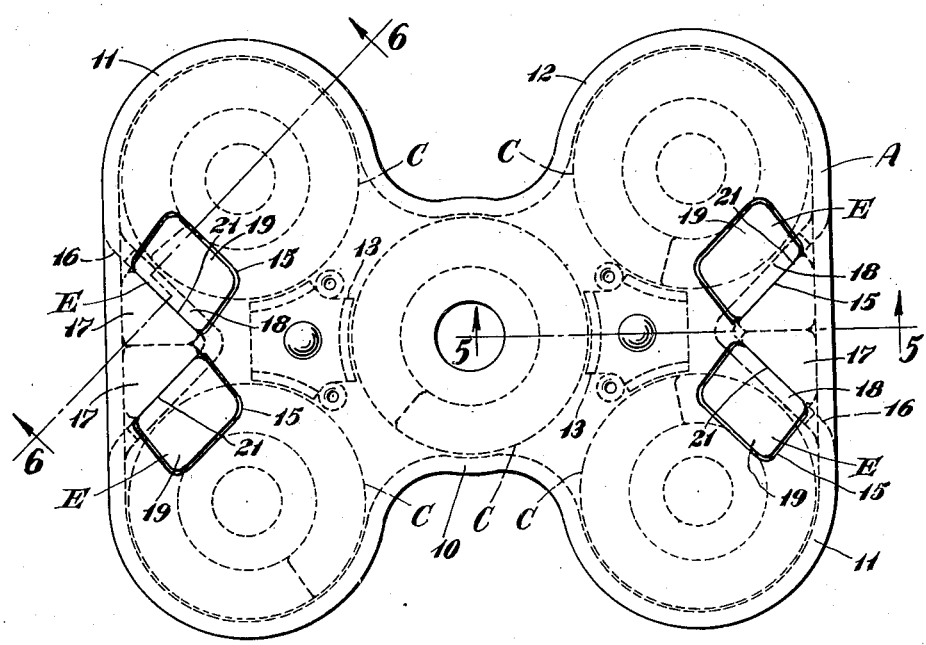
Figure 2:
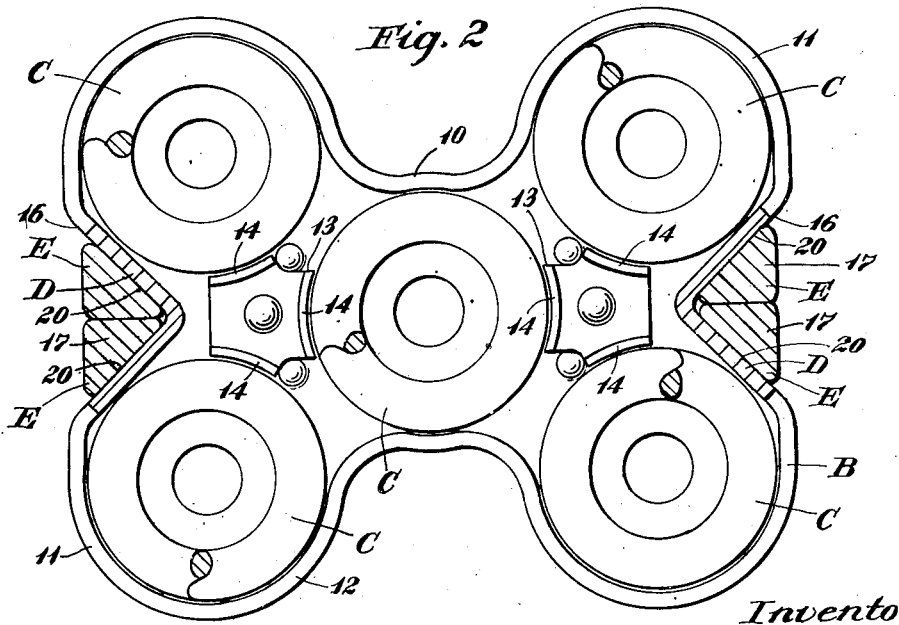

In the accompanying drawings forming a part of this specification, Figure 1 is a top plan view of my improved combined spring and friction shock absorbing mechanism. Figure 2 is a horizontal sectional view, corresponding substantially to the line 2—2 of Figure 3. Figure 3 is a front elevational view, looking upwardly in Figure 1. Figure 4 is a side elevational view, looking toward the left in Figure 1. Figure 5 is a vertical sectional view, corresponding substantially to the line 5—5 of Figure 1. Figure 6 is a vertical sectional view, corresponding substantially to the offset line 6—6 of Figure 1.

My improved combined spring and friction shock absorbing mechanism is interposed between the truck bolster and spring plank of the truck of a railway car and forms a unit, replacing the usual truck spring cluster and cooperating spring plates.

As shown in the drawings, my improved combined spring and friction shock absorbing mechanism comprises broadly top and bottom spring follower plates A and B; five coil springs C—C—C—C—C; a set of two friction elements D—D rigid with the spring follower plate B; and two pairs of tiltable friction members E—E and E—E cooperating with the friction elements D—D, respectively.

The spring follower plates A and B are of similar design, except as hereinafter pointed out. Each spring follower plate is shaped to support a cluster of five springs, a central coil spring and four springs surrounding the central coil, the four springs being arranged in pairs at opposite sides of the spring follower plates. Each plate comprises a central portion 10 and side wings 11—11 extending transversely. Each spring follower plate has a right angular edge flange 12 which extends substantially entirely around the same. The flanges 12 and the edges of the spring plates A and B are rounded, as shown, to center the springs. In addition, each spring follower plate is provided with a pair of centering lugs 13—13 riveted to the same. Each centering lug is provided with three arc-shaped, right-angular flanges 14—14—14 which engage the two outer springs at each side of the mechanism and the central spring to hold the same centered. The plate A is provided with four rectangular openings or seats 15—15—15—15, which extend entirely therethrough. The openings 15 are arranged in pairs at oposite sides of the plate and the openings of each pair are arranged diagonally at opposite sides of a central vertical plane coincident with the vertical central axis of the plate. These openings serve to accommodate sections of the foot portions or base members of the tiltable friction members E, as hereinafter more clearly described.

The spring follower plate B is indented at opposite sides, as indicated at 16—16, and has the friction elements D—D integral therewith, each element D being formed by a vertically upstanding wall portion of V-shaped, transverse cross section, said wall portion being continuous with the plate.

The five springs C are arranged in the manner of the usual five spring cluster for railway car trucks. Each spring C comprises a single helical coil and one of said springs is disposed centrally of the spring follower plates A and B and the remaining four springs are disposed in pairs at opposite sides of the central spring, being supported on the wings 11—11 of the spring follower plates.

The friction members E—E and E—E are arranged in pairs at opposite sides of the mechanism and cooperate with the friction elements D—D at the corresponding sides of the mechanism. Each friction member E has an upstanding post portion 17 of substantially triangular cross section and a laterally projecting base portion or foot 18 provided with a toe 19 at the outer end thereof. The toe 19 is thickened, as shown, and is of substantially rectangular outline to fit loosely in the corresponding opening or seat 15 of the spring follower plate A. The friction members E of each pair are arranged side by side in face to face contact with each other, occupying the space between the laterally diverging faces of the V-shaped friction element D, which diverging faces are indicated by 20—20. Each face 20 is substantially flat and provides a friction surface with which the corresponding member E cooperates. The friction faces 20—20 of each element D are on the outer sides thereof and lie in vertical planes, each vertical plane being at right angles to a vertical plane coincident with the vertical central axis of the spring C, which cooperates with the friction member E, which engages the corresponding friction face 20. The two friction members E—E, which cooperate with one of the friction elements D, are provided with friction surfaces 21—21 on their inner sides, which have sliding engagement with the friction faces 20—20 of the V-shaped plate section of the element D. The springs C—C of the pair at each side of the mechanism overlap the toe portions 19—19 of the members E—E, which are at the same side, and press the toe portions downwardly to tilt the friction members E—E toward the element D into tight frictional engagement therewith. The foot portion 18 of each plate inwardly of the toe 19 thereof bears on the follower plate B inwardly of the seat 15 and has fulcruming movement on said plate. As shown in Figure 6, the seat 15 is of ample depth to accommodate the toe 19 and provide clearance so that the latter will not contact with the face of the truck bolster on which the plate A bears.

The operation of my improved combined spring and friction shock absorbing mechanism is as follows: Upon relative approach of the spring plank and truck bolster of the car, the coils of the group or cluster of springs C are compressed between the plates A and B. At the same time, the friction elements D and members E are forced to slide lengthwise on each other, being actuated respectively by the bottom and top spring plates B and A. A friction snubbing action is thus provided during compression of the springs. During recoil of the springs, the friction elements are returned to the normal position shown in Figures 3, 4, 5, and 6, the friction elements D and friction members E being moved outwardly away from each other with the spring follower plates by recoil action of the springs, which springs engage over the base members or foot portions of the members E. The recoil action of the springs is dampened or snubbed by the friction elements D and friction members E which are held in tight frictional engagement through the spring pressure acting on the rocking base portions of the members E.

I claim:

1. In a friction shock absorbing mechanism interposed between a pair of relatively movable members to yieldingly resist relative approach thereof, the combination with opposed end follower plates; of a lengthwise extending friction element of V-shaped, transverse cross section rigid with one of said plates, said element presenting laterally diverging, vertically extending friction surfaces; a pair of lengthwise extending friction members having sliding engagement with the respective friction surfaces of said element, said members having the laterally projecting base portions in rocking engagement with the other follower plate; and spring means interposed between and engaging said plates, said spring means overlapping the base portions of said friction members to rock the latter into tight frictional engagement with the friction surfaces of said element.

2. In a friction shock absorbing mechanism interposed between a pair of relatively movable members to yieldingly resist relative approach thereof, the combination with a pair of opposed end follower plates bearing on said members respectively, one of said plates having a lengthwise extending friction element projecting therefrom, and the other of said plates having an opening therethrough; of a lengthwise extending friction member projecting from the other follower plate and having lengthwise sliding frictional engagement with said friction element, said friction element having a laterally projecting foot and extended toe member at the outer end of said foot, said toe member being loosely accommodated in the opening of said other plate, and the foot of said member being fulcrumed on the plate adjacent said opening to support said toe member clear of the movable member on which the plate bears; and spring means interposed between and engaging said follower plates, said spring means overlapping the toe member of said friction member to rock the latter into tight frictional engagement with the friction element.

3. In a friction shock absorbing mechanism interposed between a pair of relatively movable members to yieldingly resist relative approach thereof, the combination with a spring follower plate bearing on one of said members; of a second spring follower plate bearing on the other of said members; lengthwise extending friction elements projecting from said first named follower plate at opposite sides of the mechanism, said elements being rigid with said plate and having lengthwise extending, laterally diverging friction surfaces; lengthwise extending friction members at said opposite sides of the mechanism, said friction members being in sliding engagement with said diverging friction surfaces of the friction elements, said friction members having laterally extending base portions in rocking engagement with said second named follower plate to mount said friction members for tilting movement toward said friction elements; and a pair of coil springs at each of said opposite sides of the mechanism bearing at opposite ends on said spring follower plates, said springs of said two pairs overlapping and pressing on said base portions of the friction members to rock the latter into tight frictional engagement with said friction elements.

4. In a friction shock absorbing mechanism interposed between a pair of relatively movable members to yieldingly resist relative approach thereof, the combination with a spring follower plate bearing on one of said members; of a second spring follower plate bearing on the other of said members; a cluster of springs interposed between and bearing on said follower plates, a pair of the springs of said cluster being disposed at one side of the mechanism and another pair of the springs of said cluster being disposed at the opposite side of the mechanism; a longitudinally extending friction element projecting from said first named follower plate at said first named side of the mechanism; a pair of lengthwise extending friction members at said first named side of the mechanism having sliding engagement with said friction element; a lengthwise extending friction element projecting from said first named plate at said second named side of the mechanism; and a pair of lengthwise extending friction members at said second named side of the mechanism having sliding engagement with said last named friction element, each of said friction members having a laterally extending base portion in rocking engagement with said second named plate, the base portion of each friction member of each pair being overlapped by one of the springs of one of the pair of springs at the corresponding side of the mechanism and actuated by said spring to rock said friction member against the friction element at the corresponding side of the mechanism.

5. In a friction shock absorbing mechanism interposed between a pair of relatively movable members to yieldingly resist relative approach thereof, the combination with a spring follower plate bearing on one of said members; of a second spring follower plate bearing on the other of said members; a pair of lengthwise extending friction elements at opposite sides of the mechanism, each of said elements extending from said first named plate and being rigid therewith, each of said elements having longitudinally extending, laterally diverging friction surfaces on the outer side thereof; a pair of lengthwise extending friction members cooperating with each friction element and respectively engaging the friction surfaces thereof; a laterally projecting base portion on each of said friction members fulcrumed on said second named plate, mounting said member for tilting movement toward the cooperating friction surfaces of the corresponding friction element; and a cluster of springs interposed between said follower plates and bearing at opposite ends thereon, said cluster including a pair of springs at each of said opposite sides of the mechanism, the springs of each pair respectively overlapping and bearing on the base flanges of the friction members to rock said friction members toward the corresponding friction element into tight frictional contact therewith.

GEORGE E. DATH.

REFERENCES CITED

The following references are of record in the file of this patent:

UNITED STATES PATENTS

| Number | Name | Date |
| --- | --- | --- |
| 882,279 | Washburn | Mar. 17, 1908 |
| 2,091,783 | Lazna | Aug. 31, 1937 |
| 2,143,154 | Johnson | Jan. 10, 1939 |
| 2,386,895 | Haseltine | Oct. 16, 1945 |